Figure 4:
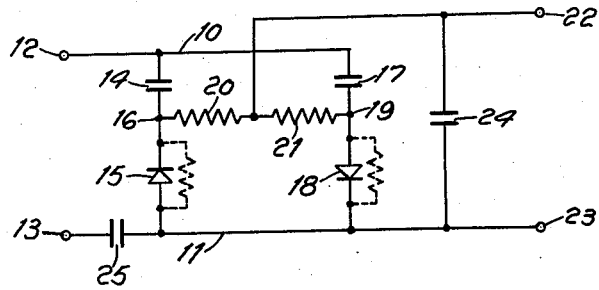

Dec. 8, 1959

R. T. ADAMS ET AL 2,916,618

PULSE DETECTOR RESPONSIVE TO BOTH PULSE
AMPLITUDE AND DUTY CYCLE

Filed May 16, 1957

2 Sheets-Sheet 1

Inventors
ROBERT T. ADAMS
JACK B. HARVEY

By Bernard E. Franz
Attorney

Dec. 8, 1959   R. T. ADAMS ET AL   2,916,618
PULSE DETECTOR RESPONSIVE TO BOTH PULSE
AMPLITUDE AND DUTY CYCLE
Filed May 16, 1957   2 Sheets-Sheet 2

Inventors
ROBERT T. ADAMS
JACK B. HARVEY
By Bernard E. Franz
Attorney

United States Patent Office 2,916,618
Patented Dec. 8, 1959

2,916,618

PULSE DETECTOR RESPONSIVE TO BOTH PULSE AMPLITUDE AND DUTY CYCLE

Robert T. Adams, Short Hills, N.J., and Jack B. Harvey, New York, N.Y., assignors to International Telephone and Telegraph Corporation, Nutley, N.J., a corporation of Maryland Application May 16, 1957, Serial No. 659,693

18 Claims. (Cl. 250—20)

This invention relates to a pulse detector, and more particularly to an arrangement for obtaining a D.C. output voltage having a polarity and amplitude which depends upon characteristics of an input pulse train.

In some systems a received signal has a waveform which varies between a positive and a negative level. It is convenient to refer to the percent of a cycle that a signal of one such level is present as the duty cycle. Usually any D.C. (direct current) component originally present has been blocked by intermediate equipment. For many purposes such as AFC (automatic frequency control), AGC (automatic gain control), servo control, and other control circuits, it may be desired to derive a D.C. output having a polarity which is a function of the duty cycle and having a value which is a function of the duty cycle and amplitude of such an input pulse signal. Known detectors of this type use arrangements in which each polarity is detected and integrated separately, and usually include fast and slow time-constant circuits. Such arrangements have the disadvantage of being frequency sensitive, inefficient, and relying critically on time constants. Also the output voltage obtained is limited to the peak-to-peak voltage of the input pulse train.

It is the principal object of this invention to provide a pulse detector having a D.C. output voltage with a polarity and amplitude which is a function of the input pulse signal.

Another object is to provide such a detector which is efficient, relatively independent of frequency, and does not rely on critical time constants.

A further object is to provide a detector comprising units which may be cascaded to obtain higher output voltages.

According to the principal aspect of the invention, a pulse detector is provided comprising (1) two circuits shunted across the input terminals, each including a diode and at least one condenser in series, (2) a D.C. circuit path between the output terminals which includes the two diodes, the diodes being oppositely directed with respect to both the input and output terminals, and (3) a condenser shunted across the output terminals. With this arrangement a D.C. voltage is developed across each diode which is a function of the input pulse amplitude and duty cycle, that across one diode being with respect to one peak, and that across the other diode being with respect to the other peak. The output voltage depends upon the difference between the D.C. voltages across the respective diodes. In the preferred form of the invention, the diodes are in series with each other between the output terminals.

According to a further feature of the invention, in one arrangement a condenser is connected between each terminal of each diode and the corresponding input terminal. This arrangement comprises a unit including two diodes, which may be cascaded to provide higher output voltages.

Figure 1:
Figure 2:
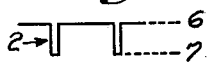
Figure 3:
Figure 10:
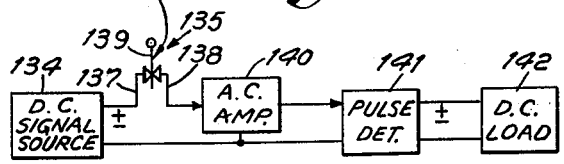
Figure 8:
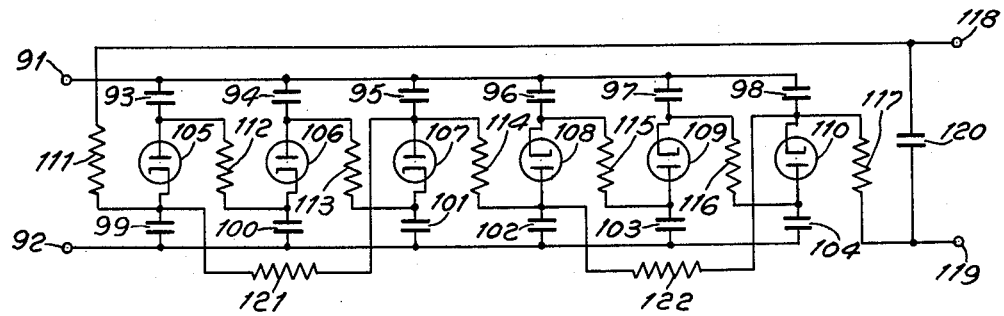
Figure 9:
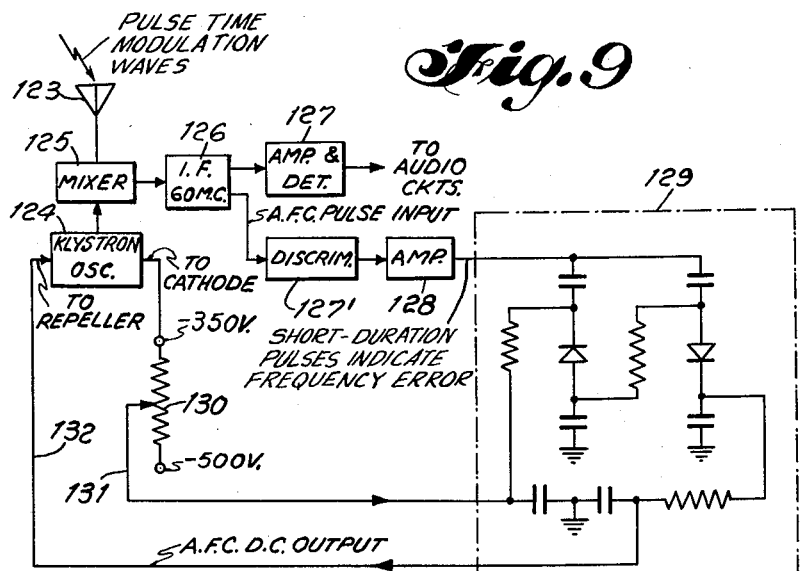

The above-mentioned and other features and objects of this invention will become more apparent by reference to the following description taken in conjunction with the accompanying drawings, in which:

Figs. 1 to 3 are graphs of possible input pulse trains;
Figs. 4 to 8 are schematic circuit diagrams of different embodiments of a pulse detector according to the invention;
Fig. 9 is a block and schematic circuit diagram of a PTM (pulse time modulation) receiver in which the AFC circuit includes a pulse detector according to the invention; and
Fig. 10 is a block diagram of a chopper type of direct-current amplifier system including a pulse detector according to the invention.

Figs. 1 to 3 show respectively pulse trains 1 to 3 which may be applied to the input of a pulse detector. The pulse train 1 comprises a short pulse at the positive level 4 with a long interval at negative level 5, and may be therefore referred to as having a low duty cycle. Pulse train 2 comprises a long pulse at the positive level 6 and a short interval at the negative level 7, and may be referred to as having a high duty cycle. Fig. 3 shows a pulse train in which the pulse at the positive level 8 is equal to the interval at negative level 9, and may be referred to as having a 50% duty cycle. For the explanation which follows, it may be assumed that the peak-to-peak voltage for each of the signals of Figs. 1 to 3 is one volt, that for Fig. 1 the duty cycle is 10%, and that for Fig. 2 the duty cycle is 90%.

One circuit arrangement for providing a pulse detector according to the invention is shown in Fig. 4. Two circuits each comprising a condenser and diode in series, are connected in shunt between a pair of wires 10 and 11 which are coupled respectively to input terminals 12 and 13. One comprises condenser 14 and diode 15 joined at point 16, and the other comprises condenser 17 and diode 18 joined at point 19. Each diode is connected to reference wire 11. The diodes 15 and 18 are oppositely directed. Resistors 20 and 21 are connected in series between the junction points 16 and 19, and the junction of these resistors is connected to the output terminal 22. The other output terminal 23 is connected to wire 11. A condenser 25 may be connected between input terminal 13 and wire 11 to isolate terminal 13 from output terminal 23 for D.C.

When a pulse signal is applied at the input terminals 12, 13, it may be seen that because of the low forward resistance of the diodes, point 16 cannot go appreciably negative and point 19 cannot go appreciably positive with respect to wire 11. A bias potential will build up on condensers 14 and 17 to a value which permits the A.C. signal to flow without clipping by the diodes. Assuming that the input signal is a pulse train 1 (Fig. 1), the potential with respect to wire 11 at point 16 will vary between zero and 1 volt positive, with a D.C. component of +0.1 volt, and at point 19 it will vary between zero and 1 volt negative, with a D.C. component of −0.9 volt. The D.C. potential at the junction of resistors 20 and 21 will be midway between that at points 16 and 19, that is −0.4 volt. This is the D.C. output at terminals 22, 23. The A.C. voltage at the output is bypassed by condenser 24.

Similarly, with an input pulse train 2 (Fig. 2), the output voltage will be +0.4 volt. With an input pulse train 3 (Fig. 3), the potential at point 16 will be +0.5 volt and at point 19, —0.5 volt, and therefore the output voltage is zero.

In Fig. 4, the diodes are in parallel with respect to the output; however, to obtain a higher output voltage they should be in series for the D.C. path, as shown in Figs. 5 to 8.

Figure 5:
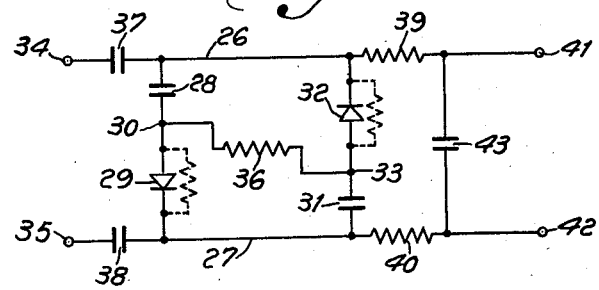

Fig. 5 shows an arrangement similar to that in Fig. 4, with two circuits, each comprising a condenser and diode in series, shunted between a pair of wires 26 and 27, which are coupled to input terminals 34 and 35. However one shunt circuit, comprising condenser 28 and diode 29 joined at point 30, has the diode 29 connected to wire 27; while the other shunt circuit, comprising condenser 31 and diode 32 joined at point 33, has diode 32 connected to wire 26. A resistor 36 provides a D.C. connection between points 30 and 33 while providing a high A.C. impedance. Condensers 37 and 38 block D.C. from the input terminals 34 and 35; and resistors 39 and 40 provide a high A.C. impedance between wires 26 and 27 and the respective output terminals 41 and 42. Condenser 43 provides an A.C. shunt across the output terminals.

Direct-current voltages are developed across the diodes as explained for the arrangement of Fig. 4. With an input pulse train 1, point 30 varies in potential with respect to wire 27 between zero and 1 volt negative with a D.C. component of —0.9 volt; and point 33 will be at substantially the same D.C. potential as point 30. The potential of wire 26 with respect to point 33 will vary between zero and 1 volt positive with an average value of +1/10 volt. Tracing the D.C. output path from terminal 41, through resistor 39, diode 32, resistor 36, diode 29 and resistor 40, it may be seen that the output voltage is —0.8 volt. Similarly, with an input pulse train 2 the output voltage will be +0.8 volt, and with an input pulse train 3 the output will be zero.

Figure 6:
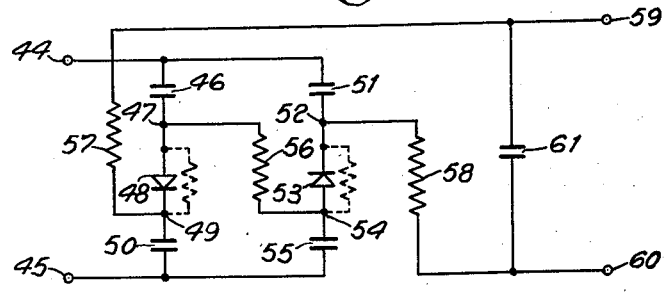

Fig. 6 shows another arrangement with two circuits shunted between a pair of wires coupled to input terminals 44 and 45. Here each shunt circuit comprises two condensers with a diode between them in series; in which, tracing from terminal 44 to terminal 45, the first comprises condenser 46, junction point 47, diode 48, junction point 49, and condenser 50; and the other comprises condenser 51, junction point 52, diode 53, junction point 54, and condenser 55. The points 47 and 54 are connected by a resistor 56, and points 49 and 52 are connected respectively through resistors 57 and 58 to output terminals 59 and 60. The output terminals are shunted by condenser 61.

When an input pulse signal is applied at the input terminals, the voltages across the diodes will have D.C. components as explained for the arrangement of Fig. 5. The D.C. output path from terminal 59 to terminal 60 comprises resistor 57, diode 48, resistor 56, diode 53, and resistor 58. The output voltage obtained with input pulse train 1 is —0.8 volt; with pulse train 2, +0.8 volt, and with pulse train 3, zero.

Figure 7:
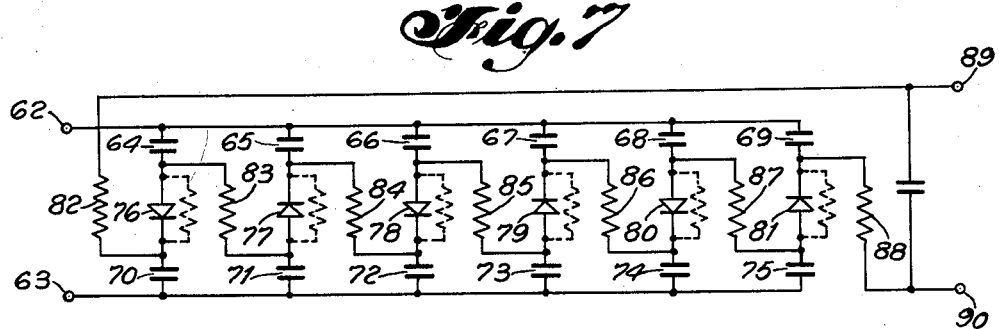

The arrangement shown in Fig. 6 may be regarded as one section which may be cascaded to obtain a higher output voltage, as shown by the triple arrangement of Fig. 7. Six diode circuits are shunted between the input terminals 62 and 63 with respective condensers 64 and 69 connected to terminal 62, condensers 70 to 75 connected to terminal 63, and diodes 76 to 81 connected between their respective condensers. Three of the diodes 66, 70 and 80 have their anodes connected to the condenser which is connected to terminal 62 and the other three 77, 79 and 81, have their anodes connected to the condenser which is connected to terminal 63. The resistors 82 to 88 connect each terminal of each diode to an output terminal or another diode.

With an input pulse signal applied at the input terminals, each diode will assume a D.C. voltage drop across it, as explained for Fig. 6. Tracing the D.C. output circuit from output terminal 89 through the resistors and diodes in series to terminal 90, it will be seen that the output voltage with an input pulse train 1 will be —2.4 volts, with an input pulse train 2 the output voltage will be +2.4 volts, and with an input pulse train 3 the output will be zero.

In each of the disclosed arrangements, the resistors are used to provide a high impedance for A.C., and may be replaced by choke coils. As shown, the resistors may each have a value of 100,000 ohms, and the condensers may each have a value of 0.01 microfarad.

It is obvious that other input waveforms than those shown in Figs. 1 to 3 may be applied to these detector circuits.

In each of the above circuit arrangements, it has been assumed that the diodes are of the semiconductor type having a relatively low back resistance, as indicated by the dotted resistors, such that a continuous D.C. path exists between the output terminals at all instantaneous values of input. If diodes having a very high back resistance, such as vacuum tubes, are used, it is necessary to provide shunt resistors across the diodes to maintain a continuous circuit.

In the cascade arrangement of Fig. 7, it is not necessary that the diodes be alternately poled. They may be arranged in any order. Fig. 8 shows a triple cascade arrangement, using vacuum tube diodes, in which the first three diodes are poled in one direction, followed by three diodes poled in the other direction. The six shunt circuits across input terminals 91 and 92 have respectively condensers 93 and 98 connected to terminal 91, condensers 99 to 104 connected to terminal 92, and diodes 105 to 110 connected between the respective condensers. Output terminals 118 and 119 are shunted by condenser 120 and resistors 111 to 117 interconnect the respective output terminals and diode terminals. With this arrangement of the diodes, a single shunt resistor may be connected between the cathode of diode 105 and the anode of diode 107, and shunt resistor 122 may be connected between the anode of diode 108 and the cathode of diode 110, to provide a D.C. path when the diodes are biased in the reverse direction.

In the PTM receiver shown in Fig. 9, a signal received on antenna 123 and the signal from a local oscillator 124 are combined in mixer 125 to provide a 60 megacycle IF (intermediate frequency) signal in IF strip 126. This IF signal is amplified, demultiplexed and detected in unit 127 to provide several audio output circuits. For automatic frequency control, an output signal is taken from the IF strip 126 and applied to a discriminator 127'. The output from the discriminator will be a pulse train in which the amplitude and polarity depend upon the frequency error, the amplitude increasing as the error increases, and the polarity indicating the direction of the error. This signal is amplified in amplifier 128 and applied to pulse detector 129. The signal will be a positive pulse if the frequency is higher than it should be or a negative pulse if the frequency is lower than it should be. The signal, thus, may take the form of the pulses of Fig. 1 or 2, according to the direction of the frequency error wherein in Fig. 1 the zero axis will be at level 5 and in Fig. 2 the zero axis would be at the level 6. This pulse detector is similar to that shown in Fig. 6, except that a ground point is provided for the A.C. input.

The klystron oscillator 124 is operated with its cathode connected to a —350 volt D.C. source, and its repeller coupled to the sliding tap of resistor 130 connected between the —350 and a —500 volt terminal of the D.C. source. The slider provides a manual frequency adjustment. The output of the pulse detector circuit is connected in series between wires 131 and 132 to provide varying voltage to the repeller according to the error in the IF frequency.

One method of amplifying a D.C. signal is shown in Fig. 10. The output from a D.C. signal source 134 is converted to a pulse signal by a chopper, such as a vibrator 135 connected to close the circuit when the fixed contacts 137 and 138 are shorted by moving contact 139. The pulses obtained have a polarity and amplitude equal to that of the D.C. signal. This pulse train is amplified in an A.C. amplifier 140, where the D.C. component is lost. In prior arrangements, the amplified pulse train is reconverted to D.C. by some complicated arrangement such as a vibrator synchronized with vibrator 135. According to a feature of this invention, the amplified pulse train is applied to a pulse detector 141, which may be similar to any one of the embodiments shown in Figs. 4 to 8, to obtain a D.C. output to load 142 having a polarity and amplitude according to that of the input signal.

While we have described above the principles of our invention in connection with specific apparatus, it is to be clearly understood that this description is made only by way of example and not as a limitation to the scope of our invention as set forth in the objects thereof and in the accompanying claims.

We claim:

1. A pulse detector comprising a pair of input terminals coupled to a pulse source, two circuits coupled in shunt across said input terminals, each including a diode and capacitive means in series, a pair of output terminals, a capacitor shunted across said output terminals for bypassing alternating current and a direct current circuit connecting each side of each diode to opposite ones of said output terminals, said diodes being oppositely directed with respect to both said input and said output terminals to provide a direct current voltage only across said output terminals having a value and polarity which depends upon the voltage waveform supplied across said input terminals.

2. A pulse detector according to claim 1, wherein said diodes are connected in series opposition with respect to said output terminals.

3. A pulse detector according to claim 2, wherein said direct current circuit includes series impedance devices interconnecting said output terminals and said diodes to reduce the alternating current flowing through said direct current circuit.

4. A pulse detector according to claim 3, wherein said impedance devices are resistors.

5. A pulse detector according to claim 1, wherein said diodes are connected in parallel opposition with respect to said output terminals.

6. A pulse detector according to claim 1, wherein each said shunt circuit comprises two condensers with the diode between them in series.

7. A pulse detector according to claim 6, further including additional pairs of shunt circuits cascaded so that with respect to said output terminals all the diodes are in series.

8. A pulse detector according to claim 1, wherein said diodes are of the semiconductor type.

9. A pulse detector according to claim 1, wherein said diodes are shunted by resistors having a very high resistance compared to the forward resistance of the diodes.

10. In combination with a pulse detector according to claim 1, a receiver, a source of pulse signals, a local oscillator, means for mixing said pulse signal with the signal from said local oscillator to provide an intermediate frequency signal, a discriminator, means coupling said intermediate frequency signal to said discriminator, means in said discriminator for producing output pulses having amplitude and polarity depending upon the variation in frequency of said intermediate frequency pulses from a given frequency, means for amplifying the said pulses produced by said discriminator, means coupling the output pulses from said amplifier to said pulse detector, and means coupling the direct current output voltage from said pulse detector to said local oscillator to control the frequency thereof.

11. In combination with a pulse detector according to claim 1, a chopper type amplifying system comprising a source of direct current input signals, means for chopping said direct current signal to provide pulses, means for amplifying said pulses, means coupling said amplified pulses to said pulse detector to obtain an output voltage from said pulse detector having a polarity and amplitude according to the polarity and amplitude of said input signals.

12. A pulse detector comprising a pair of input terminals coupled to a pulse source, a plurality of circuits coupled in shunt across said input terminals, each including a diode between two condensers in series, a pair of output terminals, a capacitor shunted across said output terminals for bypassing alternating current, and a direct current path from one said output terminal to the other including said diodes in series, some of said diodes being poled in one direction and some being poled in the opposite direction with respect to both said input and output terminals to provide a direct current voltage only across said output terminals having a value and polarity which depends upon the voltage waveform supplied across said input terminals.

13. A pulse detector according to claim 12, wherein said direct current circuit includes series impedance devices interconnecting said output terminals and said diodes to reduce the alternating current flowing through said direct current circuit.

14. A pulse detector according to claim 13, wherein said impedance devices are resistors.

15. A pulse detector according to claim 12, wherein the diodes poled in one direction are connected in one group interconnected by series resistors and shunted by a resistor, and the diodes poled in the other direction are connected in another group interconnected by series resistors and shunted by a resistor.

16. A pulse detector comprising a pair of input terminals coupled to a pulse source, two circuits coupled in shunt across said input terminals, each including a diode and capacitive means in series, said diodes being oppositely directed with respect to said input terminals, an output circuit for subtracting the voltages across said diodes from each other to produce a resultant direct current output having a value and polarity which depends upon the voltage waveform supplied across said input terminals and a capacitor shunted across said output circuit for removing any alternating current present.

17. A pulse detector comprising a pair of input terminals coupled to a pulse source, two circuits coupled in shunt across said input terminals each including a diode and capacitive means in series, said diodes being oppositely directed with respect to said input terminals, a pair of output terminals, means for subtracting the voltages across said diodes from each other and means for applying the resultant voltage across said output terminals, said last-mentioned means including a capacitor to remove any alternating current present.

18. A pulse detector comprising a pair of input terminals, one being a reference terminal, coupled to a source of input pulse signals, a plurality of circuits coupled in shunt across said input terminals, each comprising a diode and capacitive means in series, some of said diodes being poled in one direction and some in the other direction with respect to said input terminals, means isolating each side of each diode from said input terminals for direct current voltage, said capacitive means charging so that the cathode-to-anode voltage across each diode varies between zero and a positive value substantially equal to the peak-to-peak voltage of said input signals, with a negative anode-to-cathode direct current voltage component across those of said diodes having the cathode coupled to said reference terminal equal in value to the positive peak voltage of said input signals, and a positive cathode-to-anode direct current voltage component across those of said diodes having the anode coupled to said reference terminal equal in value to the negative peak voltage of said input signals, and a direct current output including means for obtaining a direct current voltage proportional to the algebraic sum of the direct current components of the voltages across said diodes and capacitive means to remove any alternating current components that may be present.

References Cited in the file of this patent

UNITED STATES PATENTS

| | | |
|---|---|---|
| 2,452,013 | Friend | Oct. 19, 1948 |
| 2,802,102 | Imm | Aug. 6, 1957 |